No. 699,193. Patented May 6, 1902.
W. KÜPPERS.
DEVICE FOR CLEANING AND RUBBING COLLECTORS OF ELECTRIC MOTORS AND DYNAMO MACHINES.
(Application filed Feb. 11, 1902.)
(No Model.) 2 Sheets—Sheet 1.
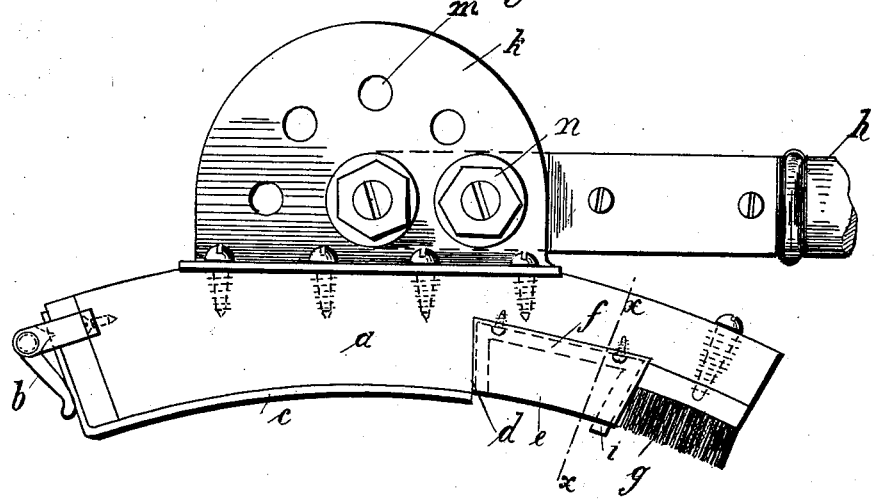
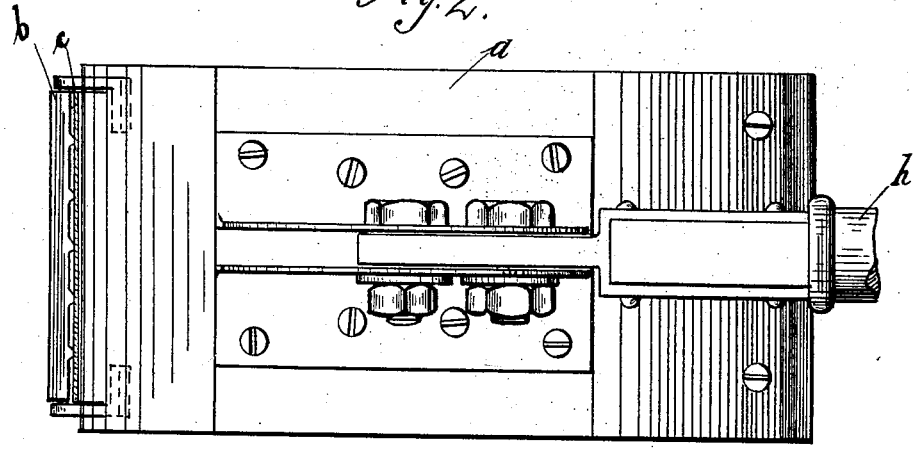
Witnesses:
E. B. Bolton
Chas. W. Aldow
Inventor:
Wilhelm Küppers
By Richards & Co
his Attorneys.

No. 699,193. Patented May 6, 1902.
W. KÜPPERS.
DEVICE FOR CLEANING AND RUBBING COLLECTORS OF ELECTRIC MOTORS AND DYNAMO MACHINES.
(Application filed Feb. 11, 1902.)

(No Model.) 2 Sheets—Sheet 2.

Witnesses:
E. B. Bolton
Ed Waldon

Inventor:
Wilhelm Küppers
By Richards&Leo
his Attorneys

UNITED STATES PATENT OFFICE.

WILHELM KÜPPERS, OF BERLIN, GERMANY.

DEVICE FOR CLEANING AND RUBBING COLLECTORS OF ELECTRIC MOTORS AND DYNAMO-MACHINES.

SPECIFICATION forming part of Letters Patent No. 699,193, dated May 6, 1902.

Application filed February 11, 1902. Serial No. 93,567. (No model.)

*To all whom it may concern:*

Be it known that I, WILHELM KÜPPERS, a subject of the King of Prussia, Emperor of Germany, residing at Auguststrasse 66, Berlin, in the Kingdom of Prussia, Germany, have invented a new and useful Improvement in Devices for Cleaning and Rubbing Collectors of Electric Motors and Dynamo-Machines, of which the following is a specification.

Hitherto the rotating collectors of electric motors and dynamo-machines were cleaned and rubbed by pressing a piece of emery cloth or paper against their surface. As such a treatment must take place while the motor or machine is running, the hand of the operator is always at close and dangerous proximity to the running parts. Besides this, the fine dust or powder of copper arising from such treatment on flying about may enter between the coils of the armature and field-magnets and cause thereby short circuits and working interruptions. The fine metal-dust being not prevented from depositing on isolated metal parts may cause there an electrical circuit. These disadvantages may be avoided on using the hereinafter-described device, the characteristic features of which consist of a cavity or receiver for collecting the metal-dust rubbed off from the rotating collector in combination with means for cleaning the collector.

This new device is illustrated in the accompanying drawings, in which—

Figure 3:
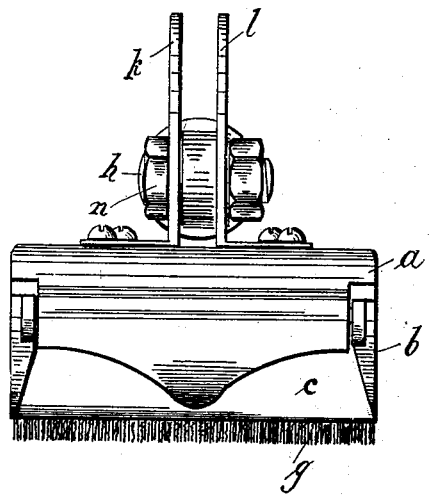
Figure 4:
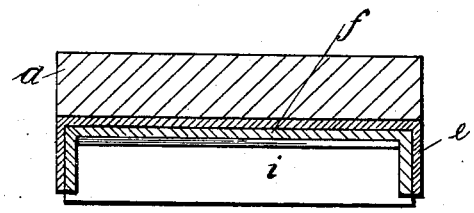

Figure 1 is a side elevation; Fig. 2, a top view; Fig. 3, a front view; and Fig. 4, a detail view in section, taken on line $x\ x$ of Fig. 1.

$a$ is a massive block, the under surface of which is curved correspondingly, so as to fit on the cylindrical surface of the collector of the electric motor or dynamo-machine. The front face of this block is provided with a clamp $b$, which serves to hold fast an exchangeable strip of emery-paper or the like $c$, tied over the under-curved face of the block $a$. In the rear part of the block $a$ is formed a cavity $d$, fitted with a box $e$, the opening of which is level with the under face of the block $a$. The interior of the box is lined with felt or other soft material $f$. The back wall $i$ of the box $e$ consists of elastic material—for instance, india-rubber—and extends beyond the under face of the block $a$, so that it may press against the cylindrical face of the rotating collector under treatment. Behind the cavity $d$ there is a brush $g$, provided in such a manner that the bristles may slide upon the collector and clean it from any dust retained thereon. The block $a$ is provided with two plates $k\ l$ upon its upper surface for pivotally supporting a handle $h$. Each of the plates $k\ l$ have a series of holes $m$ in a semicircular line around the pivot of the handle, so that the handle may be adjusted and held in different positions by means of a screw $n$, penetrating the handle and opposite holes $m$ of the plates $k\ l$.

Upon treating the rotating collector with the above-described device the dust rubbed off from the collector by the emery-paper $c$ passes into the box $e$ and is retained therein by the soft walls of the box, while the elastic wall $i$, which presses on the surface of the collector, keeps the latter free from dust and cleans it. In order to remove any dust still clinging on the collector-surface, the brush or the like $g$ is provided at the rear end of the block $a$.

The adjustable handle $h$ renders the treatment of the collector easy without running the risk of hurting the hand of the operator.

I am aware that prior to my invention cleaning and rubbing devices for collectors have been made operating in conjunction with a curved block. I therefore do not claim such a block broadly; but What I do claim as my invention, and desire to secure by Letters Patent, is—

1. The combination, in a device for rubbing and cleaning collectors of electric motors and dynamo-machines of a rubbing-block having its under face curved corresponding to the cylindrical face of the collector with a cavity for collecting the dust rubbed off from the collector and with an elastic means sliding upon the collector for cleaning the same.

2. In a device for rubbing and cleaning collectors of electric motors and dynamo-machines the combination of a rubbing-block having its under surface curved with a strip of emery-paper tied over the under surface of the block, a cavity in the rear part of the block, a box fitted in the cavity for the entrance of dust and lined with soft material for retaining the dust, an elastic means at the rear part of the box, sliding upon the collector and keeping the same clean, and a brush at the rear part of the block for removing any dust retained upon the collector.

In witness whereof I have hereunto set my hand in presence of two witnesses.

WILHELM KÜPPERS.

Witnesses:
ALVIS SIEBER,
HENRY HASPER.